(12) United States Patent
Cho

(10) Patent No.: US 7,107,646 B2
(45) Date of Patent: Sep. 19, 2006

(54) INDUSTRIAL OIL/DUST COLLECTOR

(76) Inventor: Kuo-Chin Cho, Floor 2, No. 7, Alley 46, Lane 478, Section 1, An Ho Road, Tainan (TW)

( * ) Notice: Subject to any disclaimer, the term of this patent is extended or adjusted under 35 U.S.C. 154(b) by 570 days.

(21) Appl. No.: 10/420,793

(22) Filed: Apr. 23, 2003

(65) Prior Publication Data

US 2004/0211024 A1   Oct. 28, 2004

(51) Int. Cl.
*A47L 5/28* (2006.01)

(52) U.S. Cl. .......... 15/352; 15/246.2; 15/301; 15/302; 15/314; 15/347; 15/353; 55/429

(58) Field of Classification Search .......... 15/347, 15/353, 319, 301, 302, 246.2, 409, 314; 134/21; 138/178
See application file for complete search history.

(56) References Cited

U.S. PATENT DOCUMENTS 4,993,107 A * 2/1991 Zoni .......... 15/352
5,507,859 A * 4/1996 Kaiser .......... 95/273
6,272,719 B1 * 8/2001 Wu .......... 15/353
6,342,084 B1 * 1/2002 Pezzaniti .......... 55/361
6,434,783 B1 * 8/2002 Arnold et al. .......... 15/301
6,521,051 B1 * 2/2003 Lutich .......... 134/21

* cited by examiner

Primary Examiner—Gladys JP Corcoran
Assistant Examiner—Abraham Bahta
(74) Attorney, Agent, or Firm—Rosenberg, Klein & Lee

(57) ABSTRACT

An industrial oil/dust collector is provided with a base, a motor and an air blower are installed on the exterior of the base, an air-inlet pipe and an air-outlet pipe are provided at the front of the motor to carry out quick suction and drainage functions, and inside the base there are an oil-collecting tank and a spare oil-collecting tank provided with multiple filtering devices to filter impurities of the oil, so as to prolong the service life of the motor and the air blower.

7 Claims, 7 Drawing Sheets

INDUSTRIAL OIL/DUST COLLECTOR

BACKGROUND OF THE INVENTION

1. Field of the Invention

The present invention relates to an industrial oil/dust collector with innovatory features, and more particularly to an industrial oil/dust collector which can efficiently and quickly collect and drain off oil/dust, and it is provided with multiple filtering devices inside the base to filter impurity of the oil, so as to prolong the service life of the industrial oil/dust collector.

2. Brief Description of the Prior Art

At present, gearbox oil, motor oil, pressure oil, hydraulic oil, metal-cutting oil and the like are widely applied in many machines in factories. These industrial oils, after a period of service, must be replaced by new oils, so as to keep the machines running smoothly, and it is necessary to use an industrial oil/dust collector to dispose the used oils (usually called waste oils).

Referring to FIG. 1, a conventional industrial oil/dust collector is composed by a main body 10, an upper cover 101, a motor 102, a fan 103, a filtering device 104 and a floating ball 105. The upper cover 101 is installed on the top of the main body 10, the motor 102 under the tipper cover 101, the fan 103 under the motor 102, and the filtering device 104 and the floating ball 105 under the fan 103.

Referring to FIG. 2, while being operated, the motor 102 and the fan 103 of the conventional oil/dust collector are started to suck the liquid (industrial waste oil or chemical water) through the suction pipe 106 to the chamber 107 inside the main body 10. After being operated for several times until the floating ball 105 ascends to plug up the air-outlet 108.

There are following drawbacks in the above-described structure and operation of the conventional oil/dust collector:

1. When the chamber inside the main body is filled with liquid, it is necessary to open the upper cover and then dump the liquid. Since the main body is considerably weighty, it takes time and pain to do so.

2. The floating ball blocks the liquid from rising up when the chamber is filled with liquid, but it is not completely closed with the air-outlet. Therefore, after a long time of use, it is easy for the motor to be damaged due to the liquid pollution, and it is necessary to increase the cost to buy another new oil/dust collector.

3. The liquid sucked through the pipe contains metal impurities, and the conventional industrial oil/dust collector can not collect the metal impurities together. Without a good filtering effect, it is difficult to achieve the purpose of practicality.

SUMMARY OF THE INVENTION

Therefore, the objective of the present invention is to provide an industrial oil/dust collector that can substantially obviate the drawbacks of the related conventional industrial oil/dust collector.

An objective of the present invention is to provide an industrial oil/dust collector that can efficiently and quickly suck or drain off oil/dust.

Another objective of the present invention is to provide an industrial oil/dust collector that is provided with multiple filtering processes, and the removable filter baskets can be easily replaced.

Yet another objective of the present invention is to provide an industrial oil/dust collector which is provided with a spare oil-collecting tank that can restore oil overflowing from the main oil-collecting tank and filter impurities of the oil once, so as to prolong the service life of the motor and the air blower.

Accordingly, an industrial oil/dust collector in the present invention is provided with a base, a motor and an air blower are installed on the exterior of the base, an air-inlet pipe and an air-outlet pipe are provided at the front of the motor to carry out quick suction and drainage functions, and inside the base there are an oil-collecting tank and a spare oil-collecting tank provided with multiole filtering devices to filter impurities of the oil, so as to prolong the service life of the motor and the air blower.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
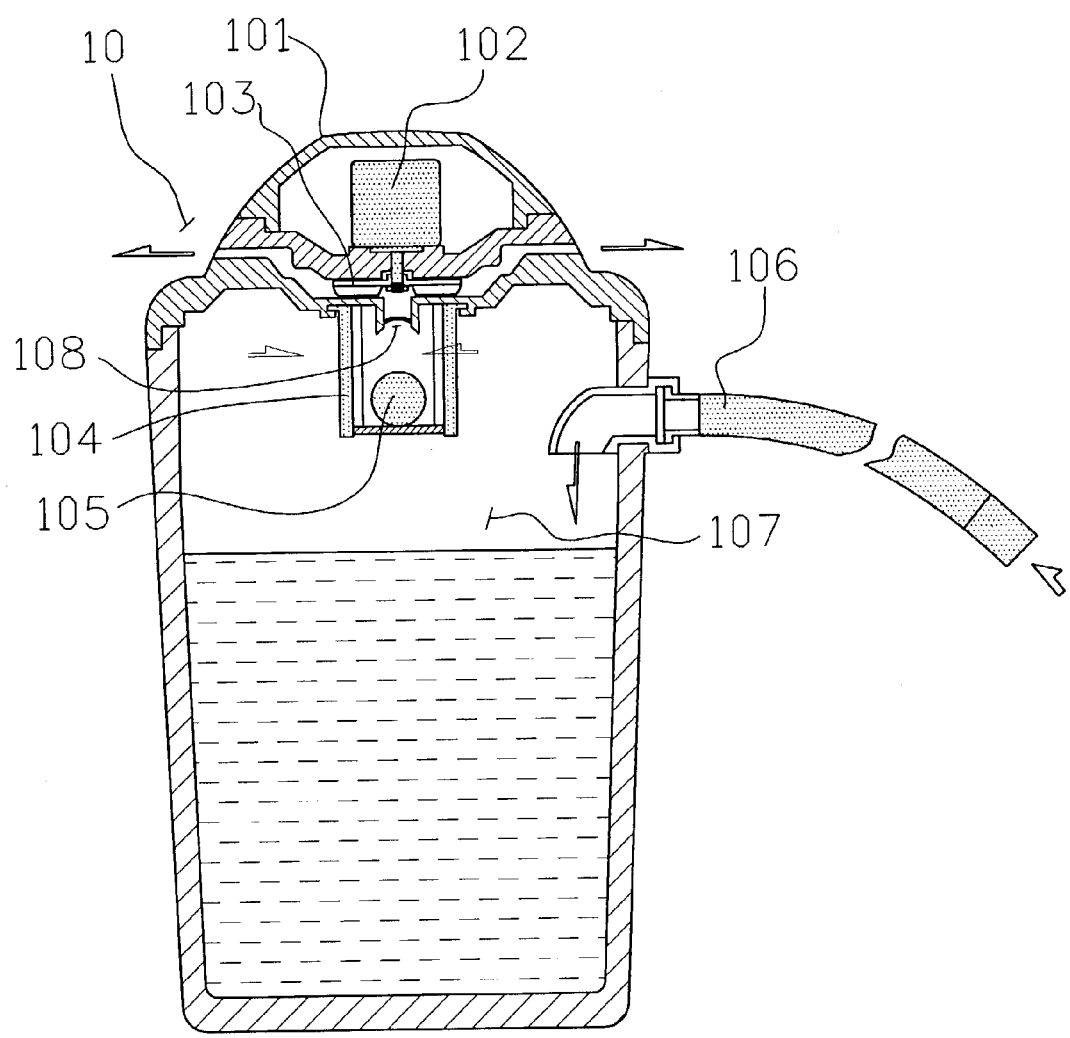
FIG. 1 is a schematic sectional view of a conventional industrial oil/dust collector.
Figure 2:
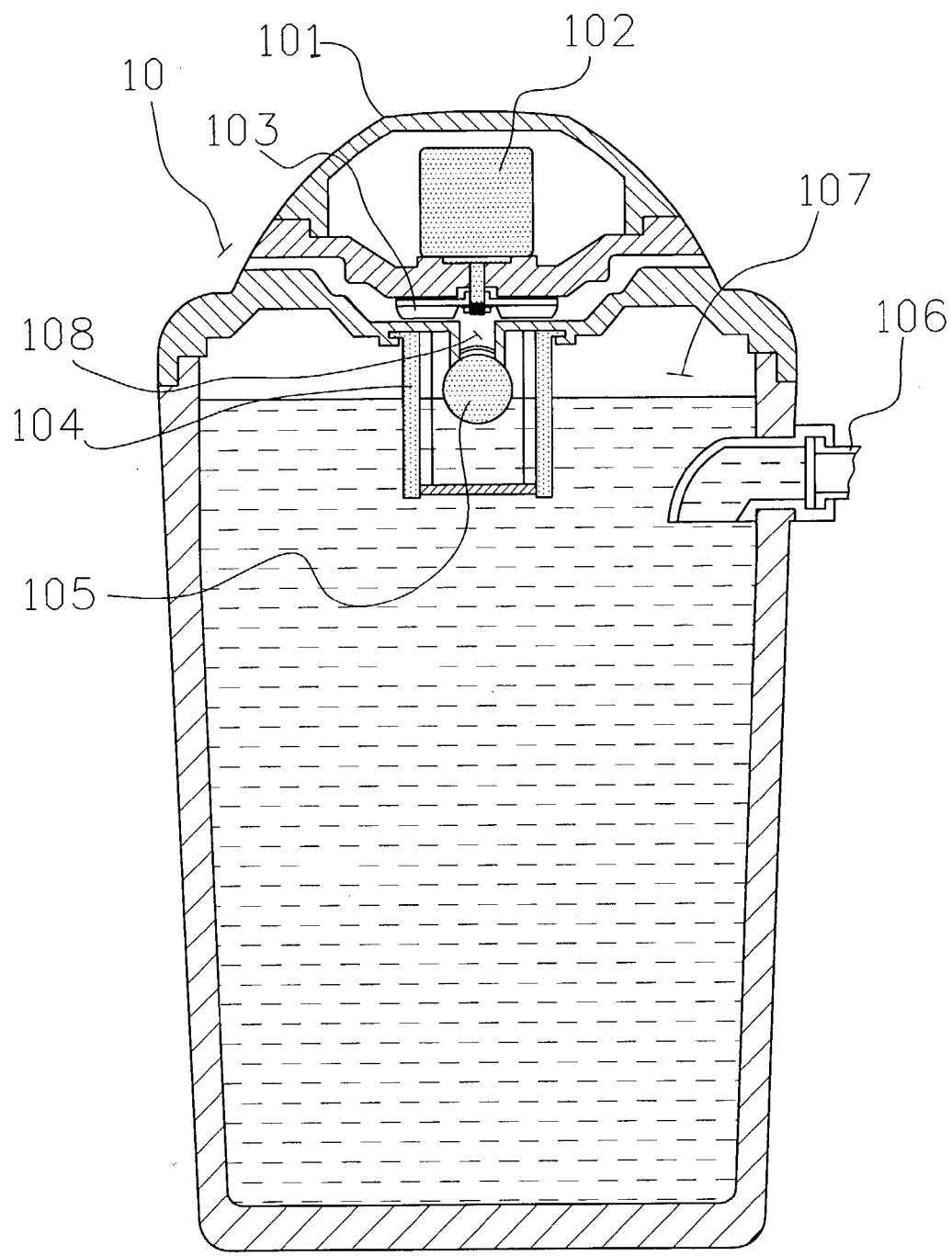
FIG. 2 is a schematic sectional view of a conventional industrial oil/dust collector showing the floating ball ascending to plug up the air-outlet hole.
Figure 3:
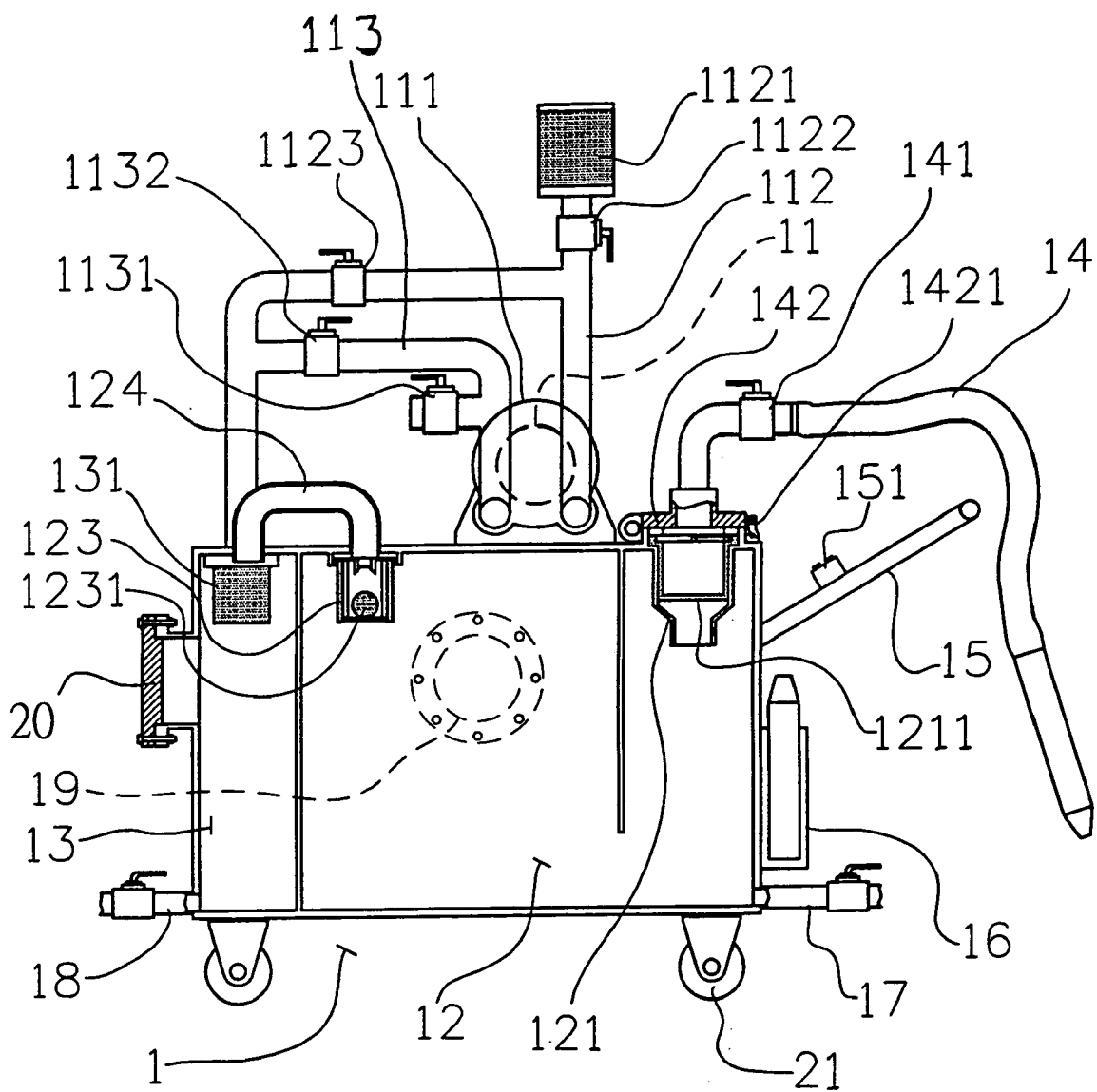
FIG. 3 is a schematic sectional view of an embodiment of the industrial oil/dust collector in accordance with the present invention.

Referring to FIG. 3, an industrial oil/dust collector includes a base 1, and an oil-collecting tank 12 and a spare oil-collecting tank 13 are provided in the interior of the base 1. A motor 11 is installed on the exterior of the base 1, an air blower 111 is provided at the back of the motor 11, and an air-inlet pipe 112 and an air-outlet pipe 113 are provided at the front of the motor 11. An air filter 1121 is provided on the upper end of the air-inlet pipe 112, a first switch valve 1122 and a second switch valve 1123 are provided at the bottom of the air filter 1121, and the bottom end of the air-inlet pipe 112 is connected to the spare oil-collecting tank 13. The air-outlet pipe 113 is provided with a third switch valve 1131 and a fourth switch valve 1132, and the bottom end of the air-outlet pipe 113 is connected to the spare oil-collecting tank 13.

The oil-collecting tank 12 is pivotally jointed with a suction pipe 14, which is provided with a switch valve 141. One end of the suction pipe 14 is connected to a suction pipe cover 142. At one side of the suction pipe cover 142 is provided with a lock article 1421. A push pole 15 and a suction pipe head receiving groove 16 are provided at one side of the base 1, and a switching device 151 is provided on the push pole 15. A drainage pipe 17 is provided at the lower section of one side of the base 1, so as for the liquid in the oil-collecting tank 12 to be drained off, and a second drainage pipe 18 is provided at the lower section of the other side of the base 1, so as for the liquid in the spare oil-collecting tank 13 to be drained off. Two cleaning openings 19 and 20 are provided on the surfaces of the base 1 respectively for cleaning the oil-collecting tank 12 and the spare oil-collecting tank 13. Wheels 21 are provided on the bottom of the base 1.

Figure 4:
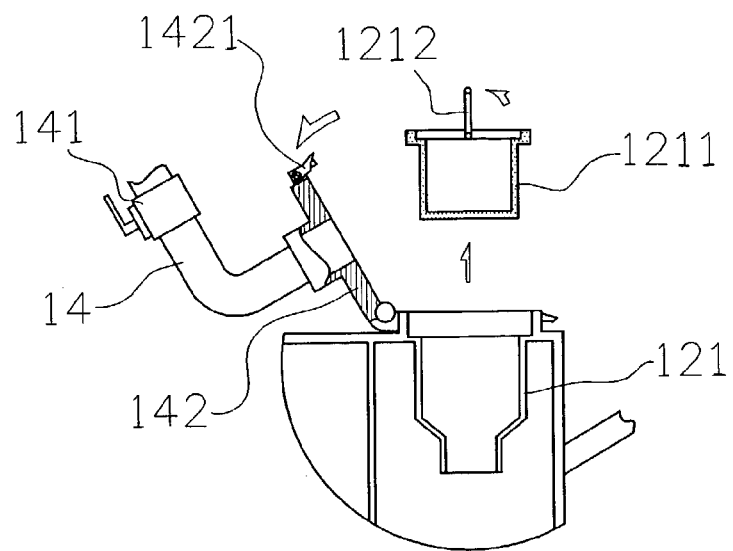
FIG. 4 is a sectional view of an embodiment of a removable filter blanket being operated in accordance with the present invention.
Figure 5:
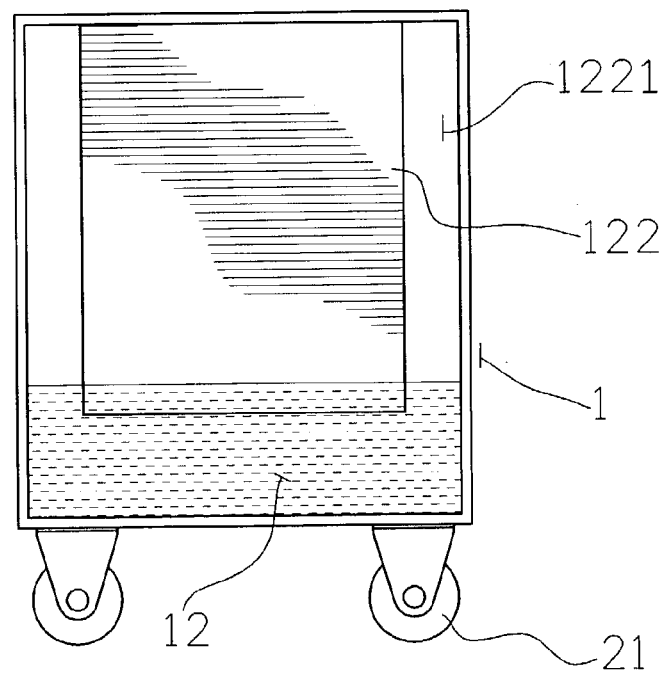
FIG. 5 is a sectional view of an embodiment of the dummy plate being operated in accordance with the present invention.

The oil-collecting tank 12 is provided with a filtering chamber 121 at the connection to the suction pipe cover 142. A removable filter basket 1211 is provided inside the filtering chamber 121, and the removable filter basket 1211 is provided with a suspension loop 1212, as shown in FIG. 4. A partition plate 122 is provided at one side of the filtering chamber 121, and two through portions 1221 are respectively carved at the top left and right sides of the partition plate 122, as shown in FIG. 5. A filter net 123 is provided at one side of the partition plate 122, and a floating ball 1231 is provided in the filter net 123. A connecting pipe 124 is provided on the top of the filter net 123, and the connecting pipe 124 is connected to the spare oil-collecting tank 13. The spare oil-collecting tank 13 is also provided with a filter device 131, including a filter net and a floating ball.

Figure 6:
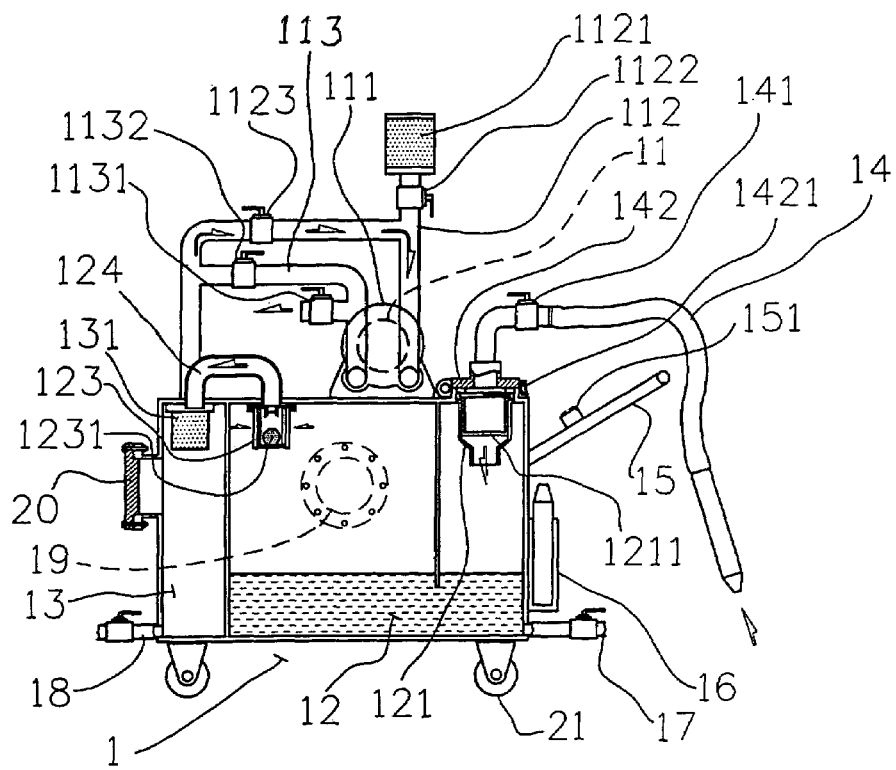
FIG. 6 is a schematic view of an embodiment of the industrial oil/dust collector in accordance with the present invention being operated to suck oil.
Figure 7:
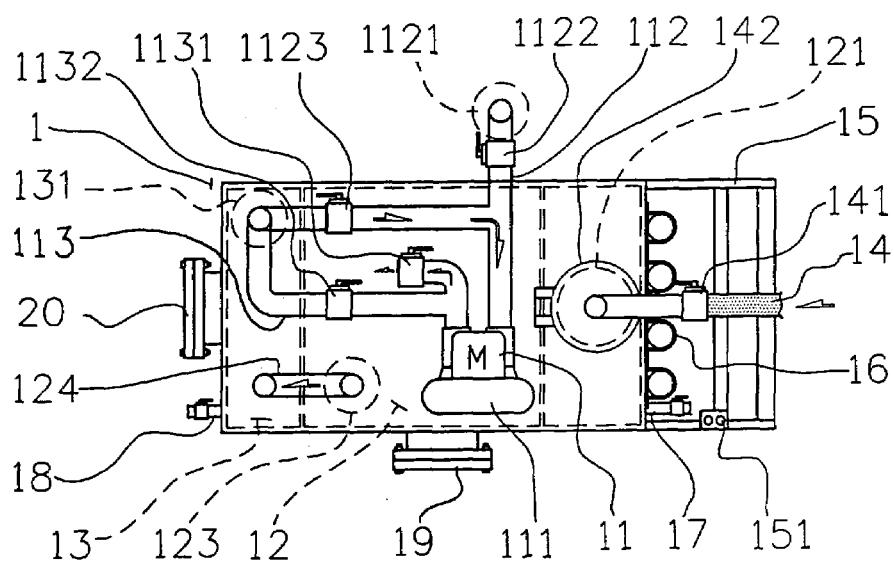
FIG. 7 is a top view of an embodiment of the industrial oil/dust collector in accordance with the present invention being operated to suck oil.

Referring to FIGS. 6 and 7, while the industrial oil/dust collector being operated to suck oil, the switching device 151 is turned on to start the motor 11 and run the air blower 111, and the third switch valve 1131 is opened for the air to enter, be filtered by the air filter 1121, cycle in the oil-collecting tank 12 and the spare oil-collecting tank 13 and then be exhausted through the air-outlet pipe 113. Therefore, it will become vacuum inside the oil-collecting tank 12 and the spare oil-collecting tank 13, so as to drive the suction pipe 14 begin sucking the liquid (wast oil or chemical water) and the contained metal impurities. After being filtered by the removable filter basket 1211 of the filtering chamber 121, the relatively heavier impurities are separated by the partition plate 122 and deposit down. The through portions 1221 of the partition plate 122 will allow the air to flow through. When the liquid rises up from the bottom of the oil-collecting tank 12 to the level of the floating ball 1231, the floating ball 1231 will be forced to plug up the inlet of the connecting pipe 124, so as to prevent the liquid from overflowing. Even the liquid overflows, it will enter the spare oil-collecting tank 13. Since the spare oil-collecting tank 13 is also provided with a filter device 131, safe filtering can be made for the second time.

Figure 8:
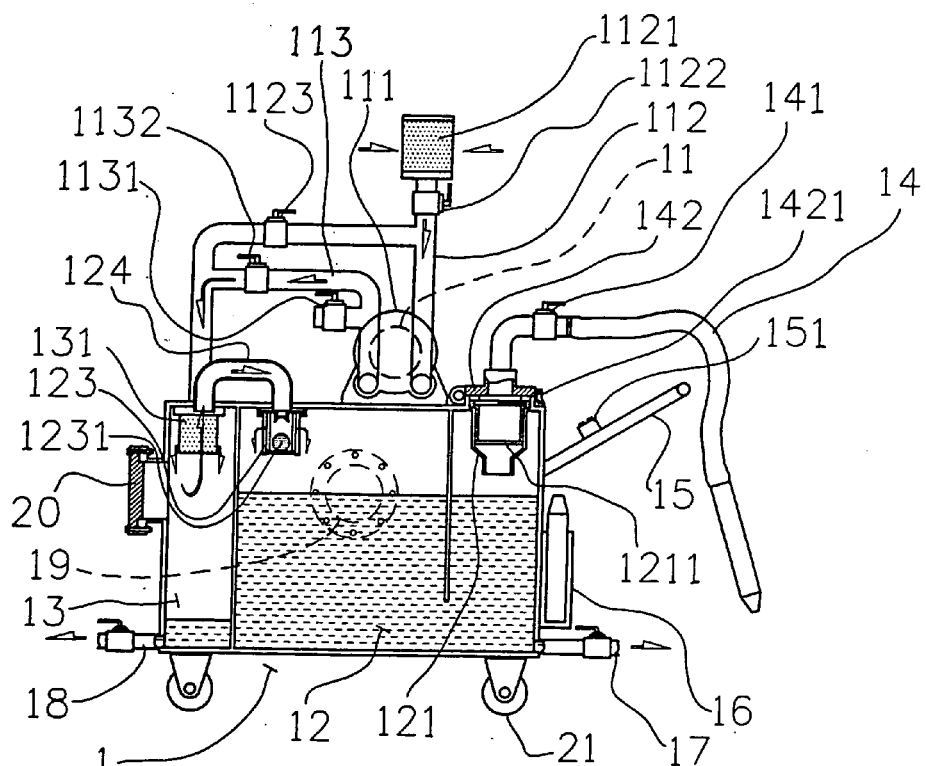
FIG. 8 is a schematic view of an embodiment of the industrial oil/dust collector in accordance with the present invention being operated to drain off oil.
Figure 9:
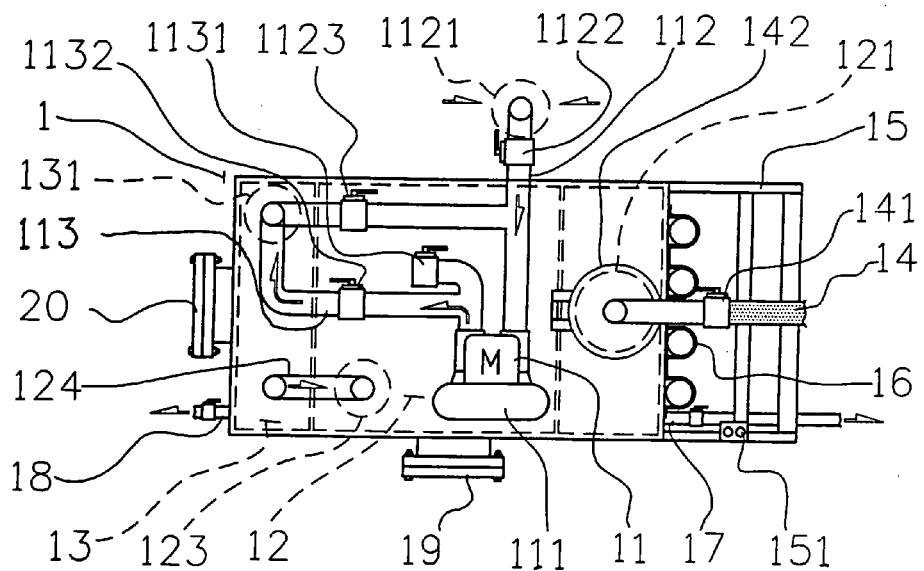
FIG. 9 is a top view of an embodiment of the industrial oil/dust collector in accordance with the present invention being operated to drain off oil; and, FIG. 10 is a sectional view of another embodiment of the industrial oil/dust collector in accordance with the present invention.

Referring to FIGS. 8 and 9, while the industrial oil/dust collector being operated to drain off oil, the switching device 151 is turned on to start the motor 11 and run the air blower 111, and the first switch valve 1122 and the fourth switch valve 1132 are opened, while the second switch valve 1123 and the third switch valve 1131 are closed. The air will enter, be filtered by the air filter 1121, and cycle in the oil-collecting tank 12 and the spare oil-collecting tank 13. Because the third switch valve 1131 of the air-outlet pipe 113 is closed, a great pressure is formed in the oil-collecting tank 12 and the spare oil-collecting tank 13 to force the liquid run out through the drainage pipe 17 and the second drainage pipe 18, so as for the liquid to be effectively drained off.

Figure 10:
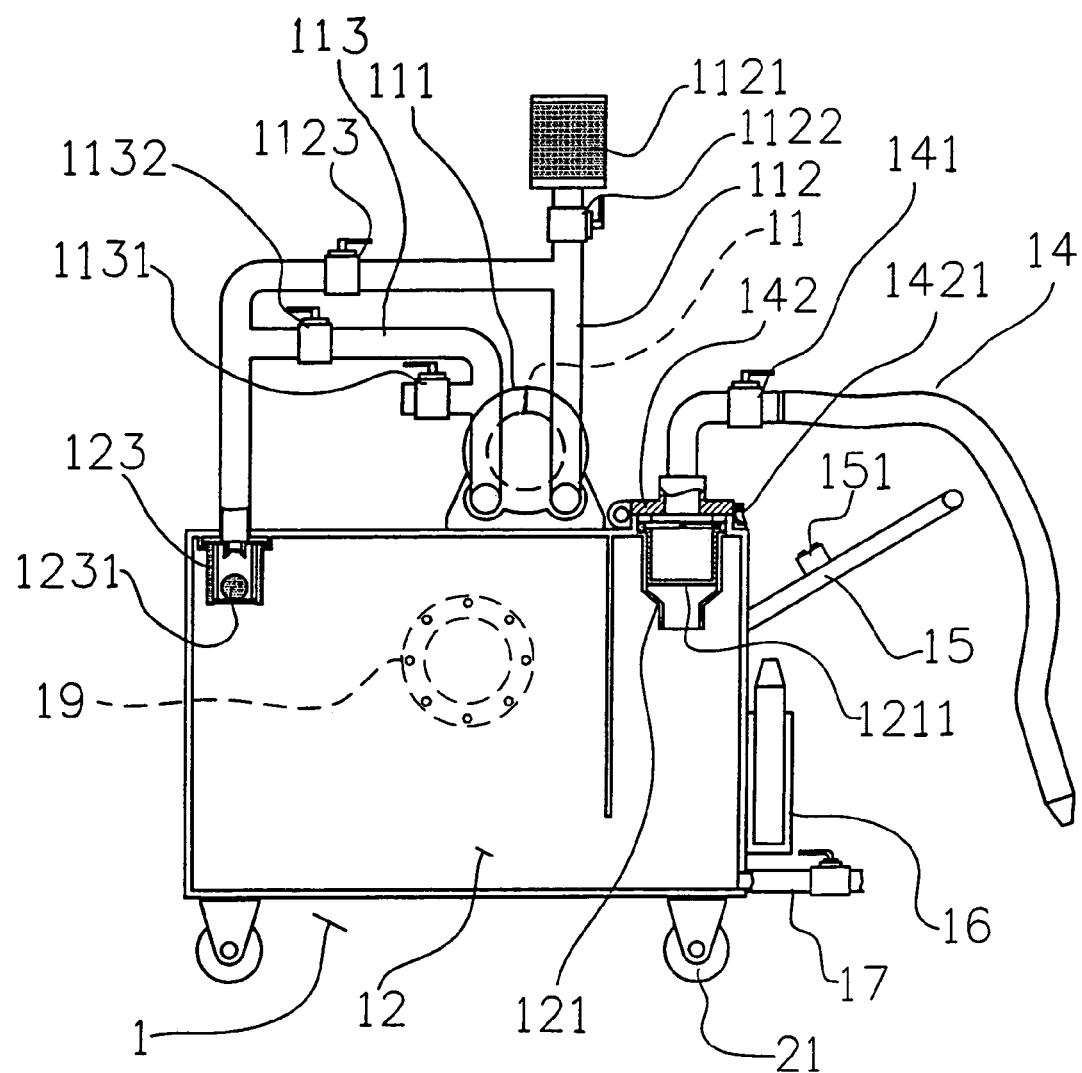

Referring to FIG. 10, the present invention may be provided with a single oil-collecting tank 12. The extremes of the air-inlet pipe 112 and the air-outlet pipe 113 are directly connected through the motor 11 to the top of the oil-collecting tank 12. The operation is the same as above-described, and it can also reach the same functional improvement and practicalibility.

While the preferred embodiments of the invention have been described above, it will be recognized and understood that various modifications may be made therein, and the appended claims are intended to cover all such modifications which may fall within the spirit and scope of the invention.

What is claimed is:

1. An industrial oil/dust collector, comprising:
    a base being provided with an oil-collecting tank and a spare oil-collecting tank in an interior thereof, said oil-collecting tank being provided with a filtering chamber at a connection to a suction pipe cover, a removable filter basket being provided inside said filtering chamber, a partition plate being provided at one side of said filtering chamber, a first filter net being provided at one side of said partition plate, a first floating ball being provided in said filter net, a connecting pipe being provided on the top of said filter net, said connecting pipe being connected to said spare oil-collecting tank, said spare oil-collecting tank being provided with a filter device, said filter device including a second filter net and a second floating ball;
    a motor and an air blower being installed on the exterior of said base;
    an air-inlet pipe and an air-outlet pipe being provided at the front of said motor, an air filter being provided on the upper end of said air-inlet pipe, a first switch valve and a second switch valve being provided at the bottom of said air filter, the bottom end of said air-inlet pipe being connected to said spare oil-collecting tank, said air-outlet pipe being provided with a third switch valve and a fourth switch valve, the bottom end of said air-outlet pipe being connected to said spare oil-collecting tank; and,
    a suction pipe being pivotally jointed with said oil-collecting tank, said suction pipe being provided with a switch valve, one end of said suction pipe being connected to a suction pipe cover, a push pole being provided at one side of said base, a switching device being provided on said push pole, a drainage pipe being provided at the lower section of one side of said base, so as for the liquid in said oil-collecting tank to be drained off, a second drainage pipe being provided at the lower section of the other side of said base, so as for the liquid in said spare oil-collecting tank to be drained off, two cleaning openings being provided on the surfaces of said base respectively for cleaning said oil-collecting tank and said spare oil-collecting tank.

2. An industrial oil/dust collector as recited in claim 1, including a suction pipe head receiving groove for receiving a head of said suction pipe is provided at one side of said base.

3. An industrial oil/dust collector as recited in claim 1, wherein a lock article is provided at one side of said suction pipe cover.

4. An industrial oil/dust collector as recited in claim 1, wherein said removable filter basket is provided with a suspension loop.

5. An industrial oil/dust collector as recited in claim 1, wherein wheels are provided on the bottom of said base.

6. An industrial oil/dust collector as recited in claim 1, wherein two though portions are respectively carved at the top left and right sides of said partition plate.

7. An industrial oil/dust collector as recited in claim 1, wherein said base is provided with a single oil-collecting tank in the interior, and the extremes of said air-inlet pipe and said air-outlet pipe may be directly connected to the top of said single oil-collecting tank.

* * * * *